United States Patent [19]
Banas et al.

[11] Patent Number: 5,137,585
[45] Date of Patent: Aug. 11, 1992

[54] METHOD OF MANUFACTURING A MULTIMETALLIC ARTICLE

[75] Inventors: Conrad M. Banas, Bolton; Gary L. Whitney, Windsor, both of Conn.

[73] Assignee: United Technologies Corporation, Hartford, Conn.

[21] Appl. No.: 338,408

[22] Filed: Apr. 12, 1989

Related U.S. Application Data

[63] Continuation of Ser. No. 228,854, Aug. 3, 1988, abandoned, which is a continuation of Ser. No. 928,333, Nov. 7, 1986, abandoned.

[51] Int. Cl.$^5$ .............................................. C21D 10/00
[52] U.S. Cl. ..................... 148/512; 148/902; 148/903
[58] Field of Search .................. 148/4, 902, 903, 910, 148/11.5 R; 219/121 LE, 121 LF; 428/610, 611, 684, 685, 686, 683

[56] References Cited

U.S. PATENT DOCUMENTS

| | | | |
|---|---|---|---|
| 3,562,009 | 2/1971 | Cranston et al. | 219/121 LF |
| 4,015,100 | 3/1977 | Gnanamuthu et al. | 148/4 |
| 4,122,240 | 10/1978 | Banas et al. | 148/4 |

*Primary Examiner*—Scott Kastler

[57] ABSTRACT

A multimetallic article of manufacture comprising a body (40) of a first metallic material with discrete regions (65) therein of a second metallic material is manufactured by the in situ alloying of a third material with the first material. The alloying is performed by depositing the third material at locations on the body where the first material is melted by an energy beam (45) such as a carbon dioxide laser or electron beam.

8 Claims, 2 Drawing Sheets

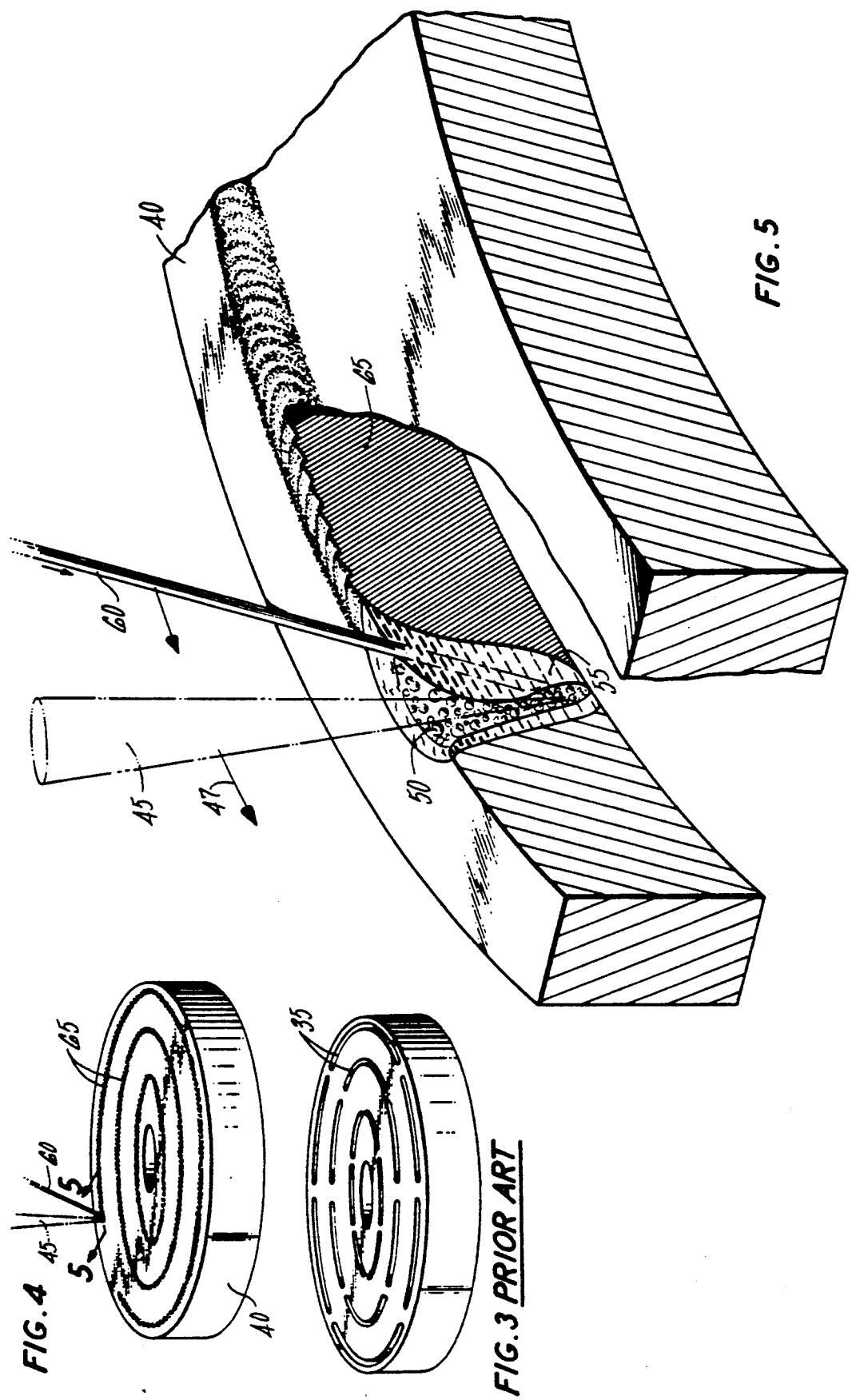

METHOD OF MANUFACTURING A MULTIMETALLIC ARTICLE

This application is a continuation of U.S. application Ser. No. 07/228,854 filed Aug. 3, 1988, which is a continuation of Ser. No. 06/928,333 filed Nov. 7,1986, both of which are now abandoned.

CROSS REFERENCE

This application relates to the subject matter of U.S. patent application Ser. No. 06/928,334 filed on even date herewith.

TECHNICAL FIELD

This invention relates generally to the manufacture of multimetallic articles of manufacture and particularly to such articles which comprise a body of a first metallic material having disposed therein, discrete areas of a second metallic material.

BACKGROUND ART

Multimetallic articles, i.e., articles formed from a first metallic material having discrete regions therein of a second metallic material, are employed in such apparatus as magnetic clutches, brakes and the like. In certain of such apparatus, the multimetallic article forms the body of an electromagnet and comprises a ferromagnetic (magnetizable) material with regions of a nonferromagnetic material such as copper or the like therein. Usually, the electromagnet body is formed in a generally flat, annular shape which may include an annular groove therein which receives an electric coil. The nonferromagnetic material extends substantially through the entire thickness of the magnet body in a multiplicity of circular segments to provide a means for reducing radial flux leakage from the electromagnet so that optimal flux is available for the magnetic coupling of the electromagnet body to a neighboring clutch or brake plate (armature).

A well known type of multimetallic electromagnetic body comprises a flat steel plate in which segmental slots are formed by machining or the like. The slots accommodate a malleable, nonferromagnetic metal such as hammered copper which reduce radial flux leakage as described hereinabove. Those skilled in the art of such electromagnet devices will immediately recognize that such a structure, requiring both machining of the ferromagnetic plate and hammering of copper into the slots thus formed, is not only time consuming, but expensive to manufacture. Furthermore, the machined slots even though subsequently filled with copper, weaken the body to such an extent that to compensate for such weakening, the overall size of the body must be increased. This may render the body, and therefore, the electromagnet in which it is used, unsuitably bulky. While some of the bulk can be reduced by eliminating the nonferromagnetic slot fillings, such as construction may not provide the requisite reduction in radial flux leakage and also, may further contribute to the mechanical weakness of the body.

Accordingly, it is evident that an improved scheme for manufacturing multimetallic articles such as electromagnet bodies is desirable.

DISCLOSURE OF INVENTION

In accordance with the present invention, a multimetallic article comprising a body formed from a first metallic material having discrete regions therein of a second metallic material which comprises an alloy of the first material and a third material, is produced by alloying the third material to the first material in situ at the locations of such regions, with heat from an energy beam, whereby the article is microstructurally continuous for enhanced strength and compactness.

The first material may comprise a ferromagnetic material which, when heated with the energy beam, melts and vaporizes at the locations of the discrete regions. The third material may comprise a material such as Nichrome or Monel which is added to the melted and vaporized ferromagnetic material. Such a process alloys the Nichrome or Monel to the steel to form discrete regions of nonmagnetizable stainless steel (in the case of Nichrome) or nonmagnetizable steel which is enriched with nickel and copper (in the case of Monel).

Since the third material is alloyed in situ to the first material, there are no discontinuities between the first material and the regions of the second material. In other words, the entire article of manufacture is microstructurally continuous for enhanced strength and, therefore, enhanced compactness. The energy beam provides a convenient means for melting the first material through substantially the entire thickness thereof, whereby the process of the present invention readily lends itself to economical and time-efficient automated techniques.

BRIEF DESCRIPTION OF DRAWINGS

FIG. 3 is an isometric view of a prior art electromagnet body employable in a magnetic clutch or brake of the type shown in FIGS. 1 and 2;

FIG. 4 is an isometric view of a multimetallic article manufactured in accordance with the present invention as zones of a second material are established in a body or blank of a first material; and FIG. 5 is an enlarged, partially sectioned view of the article of FIG. 4, taken in the direction of line 5—5 thereof.

BEST MODE FOR CARRYING OUT THE INVENTION AND INDUSTRIAL APPLICABILITY THEREOF

Figure 1:
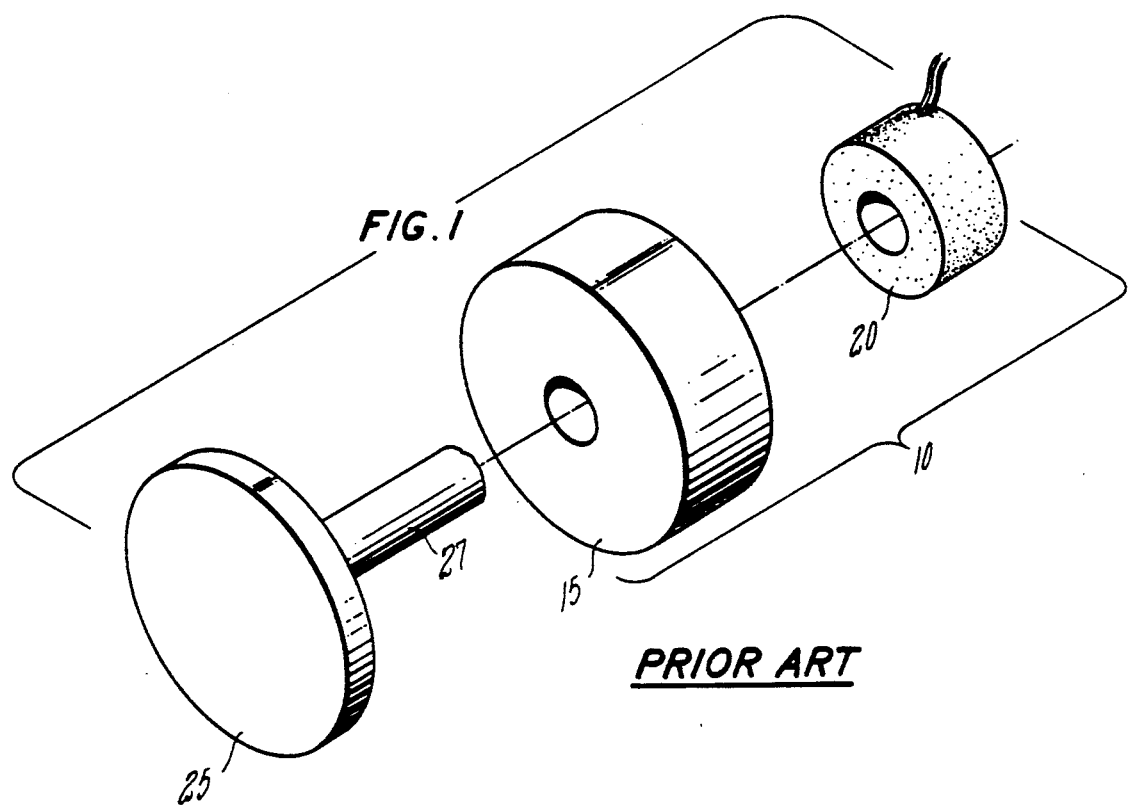
FIG. 1 is a simplified, isometric, exploded view of a prior art electromagnetic clutch or brake.
Figure 2:
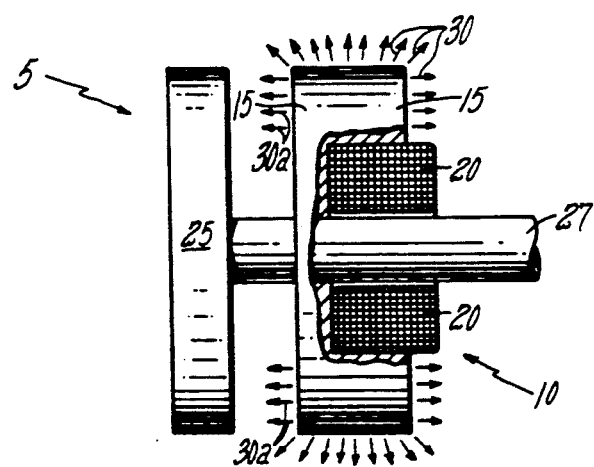
FIG. 2 is a partially sectioned elevation of the electromagnetic clutch or brake shown in FIG. 1.

Referring to FIGS. 1 and 2, a prior art magnetic brake or clutch 5 comprises an electromagnet 10 which includes a ferromagnetic body 16 having a recess therein which accommodates electric coil 20. A ferromagnetic clutch or brake plate (armature) 25 has a longitudinal shaft 27 outstanding therefrom, the shaft being reciprocatably received within coaxial apertures in body 15 and coil 20. As is well known, in operation, energization of coil 20 creates a magnetic field through and outwardly of body 15 as represented by arrows 30, such a magnetic field attracting armature 25 toward body 15 as shaft 27 slides through the aligned central apertures of the body and coil.

As those skilled in the electromagnetic arts will readily appreciate, only that portion of the magnetic field between electromagnet 10 and armature 25 is useful in actuating the clutch or brake (attracting the armature toward the electromagnet). This useful portion of the electromagnetic field is indicated by arrows 30a. It is well known that operation of the electromagnetic brake or clutch is improved significantly by tailoring the magnetic field to maximize the density of the field between the armature and the electromagnet. This is normally accomplished by magnetic insulators which block that portion of the magnetic field which would otherwise leak radially outwardly of the magnet.

FIG. 3 illustrates a prior art electromagnet body wherein spaced, circular slots 35 are machined in the electromagnet body thereby increasing the reluctance of the body at the slot locations to reduce the density of the radial field induced in the body, thereby reducing radial leakage flux therefrom. While such an electromagnet construction can indeed so reduce radial leakage flux, it is readily apparent that the removal of material in forming the slots could adversely effect the strength and structural integrity of the electromagnet. Where the electromagnet is required to carry significant mechanical loads, to compensate for the weakening of the body due to removal of the slot material, it may be necessary to increase the size (mass) of the body. However, it will be appreciated that this increases the overall bulk of the body and may, therefore, be unacceptable in situations where there are constraints on the size and/or mass of the electromagnet. It will also be appreciated that the formation of the slots by prior art methods such as machining requires a great deal of time and, therefore, may contribute significantly to the manufacturing costs of the apparatus.

Furthermore, although mere removal of ferromagnetic material from an electromagnet will completely block the radial field through those portions (slots) of the electromagnet from which the material is removed, radial flux can traverse the remaining inter-slot webs required for mechanical integrity. Attempts to replace the webs with nonferromagnetic material to further reduce radial leakage have been made. For example, nonmagnetizable material such as copper or other malleable material may be hammered, in a cold state, into annular slots. However, it will be readily appreciated that such a technique weakens the structure and requires further material and manufacturing time and thus, further increases the manufacturing costs of the electromagnet.

In accordance with the present invention, zones of extremely high reluctance for tailoring magnetic field distribution throughout an electromagnet body are formed by alloying a nonferromagnetic material with the ferromagnetic material of the body in situ, at discrete regions of the body. This forms zones of nonferromagnetic material within the body which are microstructurally continuous with respect to the remainder of the body for enhanced strength and structural integrity.

Referring to FIGS. 4 and 5, in accordance with the present invention, a ferromagnetic body 40 is heated by an energy beam 45 such as a laser beam or an electron beam which moves along the body in a circumferential direction with respect thereto as indicated by arrow 47. Alternately, the body may move with respect to the energy beam in the direction of arrow 47. In either case, energy beam 45 melts and vaporizes the ferromagnetic material through the entire thickness of the plate, the vaporized material being shown at 50 and the melted material which surrounds the core of vaporized material, at 55. As the ferromagnetic material is melted and vaporized by the energy beam, a nonferromagnetic material 60 (in this case in rod form) is added to the vaporized and melted portions of the body, forming a solution therewith which, when cooled, comprises a nonmagnetic alloy 65 of the ferromagnetic and nonferromagnetic materials.

In the preferred embodiment, the ferrogmagnetic material comprises a low hysteresis steel of from approximately 0.06% to approximately 0.10% by weight, carbon. Nonferromagnetic material 60 may comprise such metals as chromium-nickel alloys (Nichrome) or copper-nickel alloys (Monel). When material 60 comprises a chromium-nickel alloy of approximately 79% chromium and 20% nickel, which is alloyed with the hereinabove noted low hysteresis carbon steel at a 25% dilution rate, the resulting nonmagnetic alloy 65 comprises essentially 18-8 (18% chromium and 8% nickel) (304) austenitic stainless steel which forms an effective barrier to any radial magnetic flux lines within the electromagnet body. To effect the heating necessary to ally the nickel-chromium alloy with the low hysteresis carbon steel, a high energy carbon dioxide laser of the type manufactured and sold by United Technologies Corporation may be used.

It will be appreciated that an electromagnet body manufactured in accordance with the invention herein is microstructurally continuous at the borders between the ferromagnetic and nonferromagnetic regions thereof, thereby exhibiting enhanced strength in comparison to prior art electromagnet bodies wherein flux barriers therein are achieved by removal of material therefrom. This microscopic continuity enables the nonmagnetic regions to be formed in closed annuli without comprising the structural integrity of the body. Thus, spacing the nonmagnetic regions is unnecessary, thereby resulting in enhanced blockage of radial flux leakage. Furthermore, the electromagnet body is economical to produce since no machining is involved and the melting and alloying process lends itself conveniently to automated manufacturing techniques.

While the invention herein has been described with respect to an electromagnet body, it will be readily appreciated that this invention exhibits equal utility in any application where an in situ alloying of a first material with a second material by means of an energy beam to produce a microstructurally continuous multimetallic body is desired. Whereas the invention has been described with respect to specific materials utilized therein, it will be appreciated that any materials which may be alloyed with one another by in situ heating thereof, may be employed. Similarly, while the process by which the invention herein is made, is described as utilizing a laser beam to melt the materials for alloying, it will be appreciated that other equivalent energy beam devices may be employed. For example, an electron beam (noted hereinabove) may be employed within a vacuum chamber to provide the necessary heat for in situ alloying. It is intended by the following claims to cover these and any other variations or modifications, which fall within the true spirit and scope of the invention herein.

Having thus described the invention, what is claimed is:

1. In a method of forming an article of manufacture comprising a first metallic material including well defined regions therein of a second metallic material, which regions extend substantially through the entire thickness of said article of manufacture, the improvement characterized by:

heating a blank of said first material through substantially the entire thickness thereof, at locations therein corresponding to said regions, with an energy beam thereby metering and vaporizing a portion of said blank at said locations;

depositing a third metallic material within said melted and vaporized portions of said blank wherein said third material melts and forms a solution with said first material; and cooling said melted and vaporized portions whereupon said third material is alloyed in situ with said first material to form said second material within said regions, thereby lending said article of manufacture, microscopic continuity.

2. The method of claim 1 characterized by said energy beam comprising a laser beam.

3. The method of claim 2 characterized by said laser beam comprising a carbon dioxide laser beam.

4. The method of claim 1 characterized by said first material comprising a ferromagnetic metal and said third material comprising a nonferromagnetic metal.

5. The method of claim 4 characterized by said ferromagnetic metal comprising a low hysteresis carbon steel and said third material comprising an alloy of chromium and nickel, whereby said second material comprises an austenitic stainless steel.

6. The method of claim 4 characterized by said ferromagnetic material comprising a low hysteresis carbon steel and said third material comprising an alloy of copper and nickel.

7. The method of claim 5 characterized by said low hysteresis carbon steel having a carbon content of from approximately six-one hundredths to approximately one-tenth percent by weight and said chromium-nickel alloy having a chromium content of approximately eighty percent by weight and a nickel content of approximately twenty percent by weight.

8. The method of claim 5 characterized by said chromium-nickel alloy being deposited within said melted and vaporized portions of said blank at a rate of one part by weight chromium nickel alloy to three parts by weight carbon steel.

* * * * *